(12) United States Patent
Williams et al.

(10) Patent No.: US 11,310,960 B2
(45) Date of Patent: Apr. 26, 2022

(54) FLEXIBLE AUGER WRAPPER LINER FOR A CROP CONVEYING AUGER

(71) Applicant: AGCO Corporation, Duluth, GA (US)

(72) Inventors: Nicholas H. Williams, Hesston, KS (US); Dane Austin Mosel, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 223 days.

(21) Appl. No.: 16/682,148

(22) Filed: Nov. 13, 2019

(65) Prior Publication Data

US 2020/0154635 A1    May 21, 2020

Related U.S. Application Data

(60) Provisional application No. 62/768,238, filed on Nov. 16, 2018.

(51) Int. Cl.
*A01D 34/66*    (2006.01)

(52) U.S. Cl.
CPC ................................. *A01D 34/668* (2013.01)

(58) Field of Classification Search
CPC ..... A01D 34/668; A01D 34/66; A01D 34/667
See application file for complete search history.

(56) References Cited

U.S. PATENT DOCUMENTS

| | | | |
|---|---|---|---|
| 3,407,581 A * | 10/1968 | Wild | A01D 51/002 56/328.1 |
| 3,727,759 A | 4/1973 | Stevens | |
| 5,557,912 A | 9/1996 | Voss et al. | |
| 5,592,805 A * | 1/1997 | Croft | A01D 51/002 56/16.4 R |
| 8,636,568 B1 * | 1/2014 | Farley | A01F 7/067 460/68 |
| 2007/0204590 A1 * | 9/2007 | Straeter | A01D 75/282 56/318 |
| 2010/0064652 A1 * | 3/2010 | Straeter | A01D 75/282 56/303 |
| 2014/0087793 A1 * | 3/2014 | Regier | A01F 12/22 460/59 |
| 2016/0029560 A1 | 2/2016 | Jespersen | |
| 2020/0275610 A1 * | 9/2020 | Birkhofer | A01D 61/004 |
| 2020/0375101 A1 * | 12/2020 | Sloan | A01D 34/668 |

OTHER PUBLICATIONS

UK Intellectual Property Office, Search Report for related UK Application No. 081819319.3, dated Apr. 24, 2019.

* cited by examiner

*Primary Examiner* — Abigail A Risic

(57) ABSTRACT

A system having a frame, an auger operably coupled to the frame, an auger wrapper fixed to the frame and proximal to the auger, the auger wrapper having a curved surface with a first rigidity, and a liner attached to the auger wrapper, the liner comprising a second rigidity that is less rigid than the first rigidity.

19 Claims, 8 Drawing Sheets

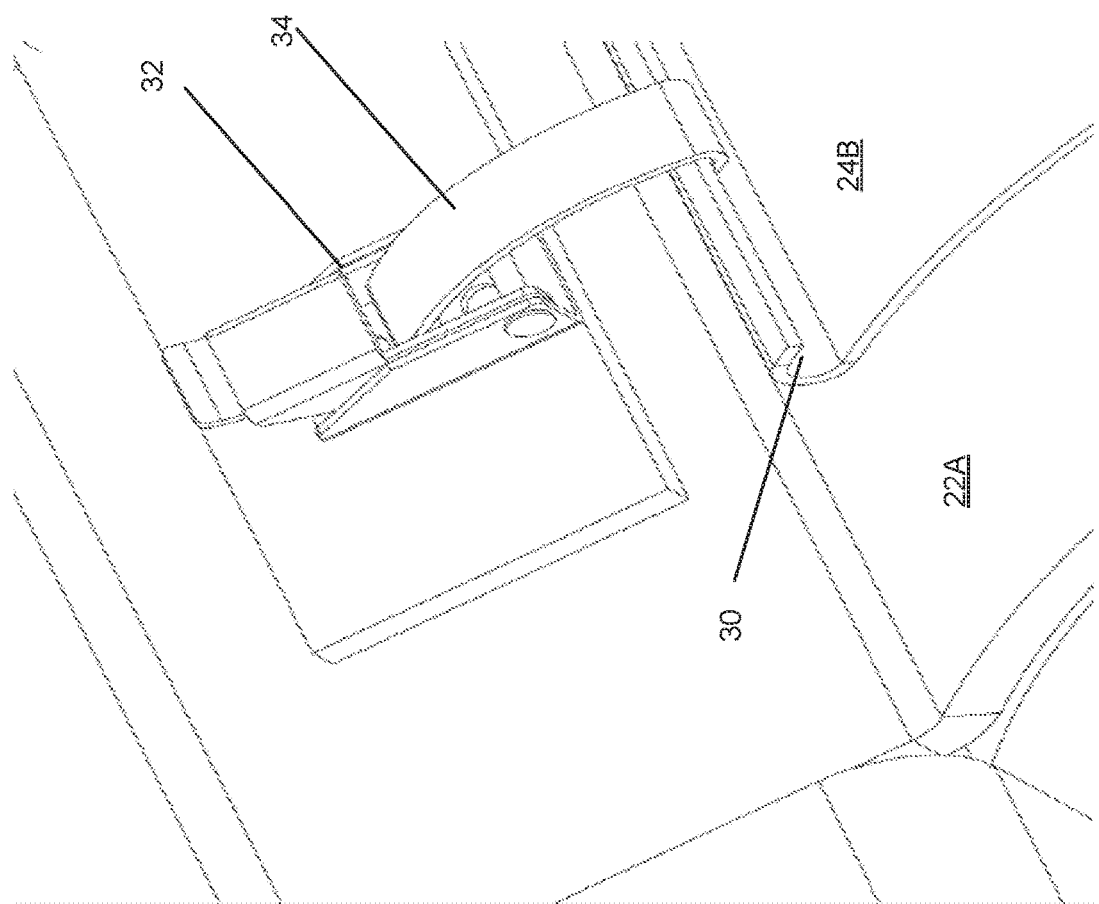

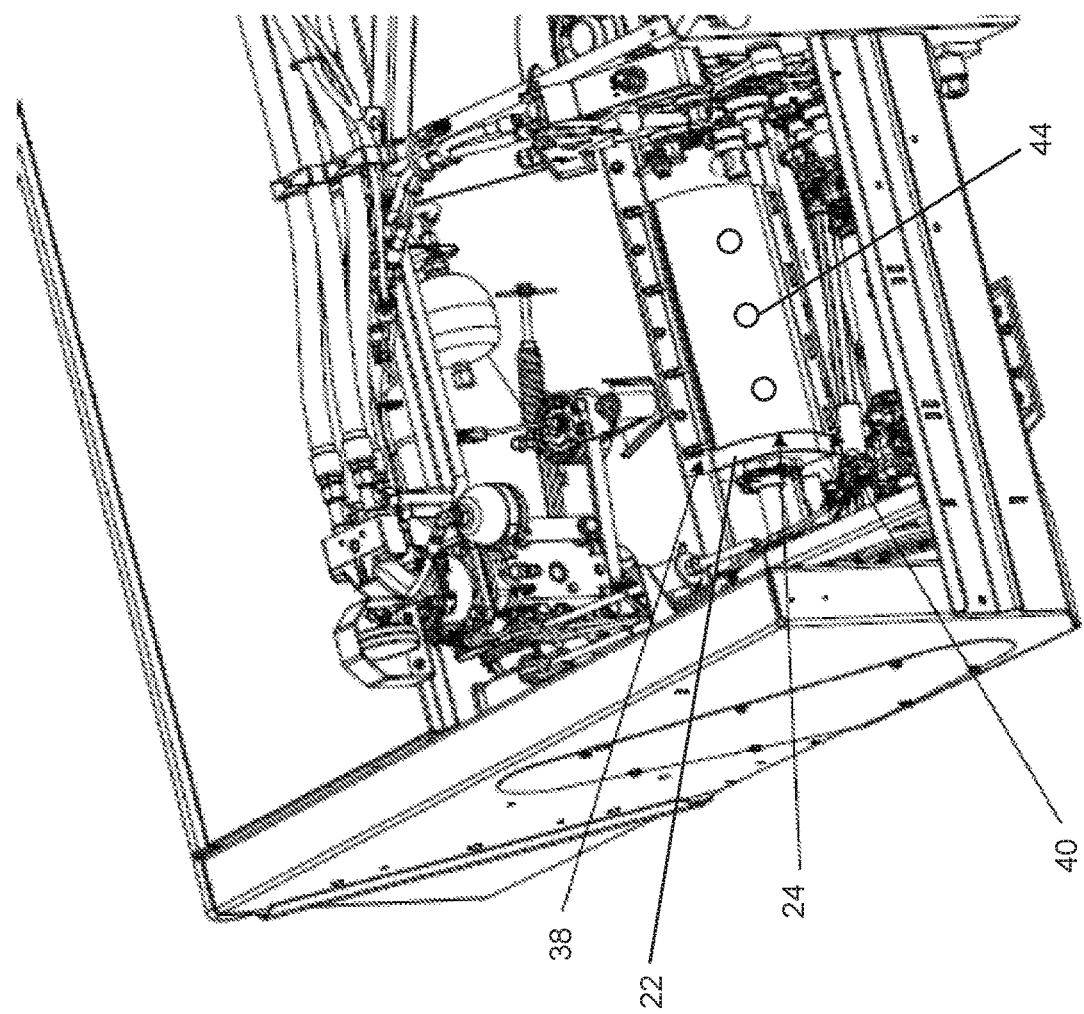

FLEXIBLE AUGER WRAPPER LINER FOR A CROP CONVEYING AUGER

CROSS REFERENCE TO RELATED APPLICATION

This application claims the benefit of U.S. Provisional Application No. 62/768,238, filed Nov. 16, 2018, which is hereby incorporated by reference in its entirety.

TECHNICAL FIELD

The present disclosure is generally related to disc/rotary mower headers.

BACKGROUND

It is common for disc/rotary mower headers to include an auger over or behind the cutting elements to assist in crop conveyance to the point of discharge or conditioning. The auger is oriented horizontally in the header and sometimes is surrounded in part by a pan or wrapper to prevent crop from wrapping around the auger. Given the auger location, it is subject to particularly demanding conditions as the header cutting elements generate a constant mixture of dust/dirt and crop residue, which laminates all of the surfaces in the header. The said mixture becomes very hard after drying and, when allowed to accumulate, leads to significant wear issues for all rotating elements, especially the auger. Currently, the only means to limit accumulation is to frequently manually wash or scrape the header. This is time consuming and is often logistically unfeasible.

SUMMARY OF THE INVENTION

One object of the present invention is to provide a system that facilitates the prevention of buildup of crop material in an auger based header. To better address such concerns, in a first aspect of the invention, a system is disclosed having a frame, an auger operably coupled to the frame, an auger wrapper fixed to the frame and proximal to the auger, the auger wrapper having a curved surface (or surfaces that approximate a curve) with a first rigidity, and a liner attached to the auger wrapper, the liner comprising a second rigidity that is less rigid than the first rigidity. The elasticity or flexibility of the liner enables material adhering to the liner to be readily removed upon a change in shape of the liner, whereby the change in shape (e.g., brought about by impacting the liner with a temporary blunt force to enable deformation and return to a normal or natural structural state or by removing all or at least part of the liner from the curved auger wrapper to enable the liner to return to its normal or natural structural state) breaks/weakens the bonds of crop material adhering to the liner, resulting in the removal or shedding away of the crop material from the liner.

In one embodiment, the auger wrapper comprises an opening and the liner is centered about the opening. The auger wrapper provides a rigid structure that has an opening that is covered by the liner, the liner providing a more elastic material that, through a change in shape, sheds the adhered-to crop material.

In one embodiment, the liner is either: fixably attached to the auger wrapper along, and adjacent to, a bottom of the opening and removably attached to the auger wrapper along, and adjacent to, a top of the opening; or fixably attached to the auger wrapper along, and adjacent to, the top of the opening and removably attached to the auger wrapper along, and adjacent to, the bottom of the opening. By removing at least a portion of the liner from the auger wrapper (e.g., removing attachments between a top side of the liner and the auger wrapper or along a bottom side of the liner and the auger wrapper), the liner (e.g., metal liner) changes shape from the curved shape it acquired through attachment to the curved auger wrapper to its normal or natural structural state (flat or substantially flat), enabling a breaking of bonds between the liner and material adhered to the liner.

In one embodiment, the liner is removably attached to the auger wrapper along, and adjacent to, a top and bottom of the opening. In this embodiment, the entire removal of the liner from the auger wrapper not only enables the transition in shape from curved to flat or substantially flat to shed adhered-to crop material, but also allows for more extensive cleaning (e.g., pressure washing) of the entire auger wrapper of any built-up material.

In one embodiment, the liner is fixably attached to the auger wrapper along, and adjacent to, a top and bottom of the opening. For instance, the liner may be comprised all or in part of a non-metal material (e.g., a polymer material) that is more elastically deformable than most metals, permitting a temporary deformation (e.g., from brief impact by hitting with a hammer or otherwise) to break the bonds of crop material adhering to the liner, while returning to its normal state after the impact.

In one embodiment, the liner is comprised of a non-metal material. The use of a non-metal material, such as a polymer material, enables the liner to be fixably attached (e.g., more permanently) along the perimeter of the liner since any deformation to remove adhered-to crop material is temporary, the liner returning to the shape it had prior to the temporary deformation. The fixable attachment renders it unnecessary to manually remove, even partly, the liner for ease in maintenance.

In one embodiment, the liner is comprised of a metal material. The use of metal liners has the benefit that, in most instances, merely removing at least a portion of the liner enables the force of the liner returning to its natural state (e.g., change of shape) to shed the crop material.

In one embodiment, the liner comprises one or more uncovered openings. With one or more uncovered openings in the liner, an operator may take a tool (e.g., crowbar) and tap or pry the liner in a manner to deform it, resulting in the shedding of adhered-to crop material from the liner.

In one embodiment, the auger wrapper comprises plural tabs adjacent to a lower surface of the auger wrapper and the liner comprises a lip running along an upper end of the liner and plural slots adjacent to and running along a lower surface of the liner, each of the plural tabs inserted through the respective plural slots to form lower end removable attachments between the auger wrapper and the liner, wherein plural latches are coupled between the lip and an upper surface of the auger wrapper to form upper end removable attachments between the auger wrapper and the liner.

These and other aspects of the invention will be apparent from and elucidated with reference to the embodiment(s) described hereinafter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3F are schematic diagrams that illustrate example shape changes based on attachment of a metal liner to an auger wrapper in an embodiment of an auger wrapper system.

FIGS. 4A-4B are schematic diagrams that illustrate, in rear perspective view, an example auger wrapper of an auger wrapper system with different stages of securement of a metal liner to an auger wrapper using a combination of removable and fixed securing mechanisms.

DESCRIPTION OF EXAMPLE EMBODIMENTS

Figure 1:
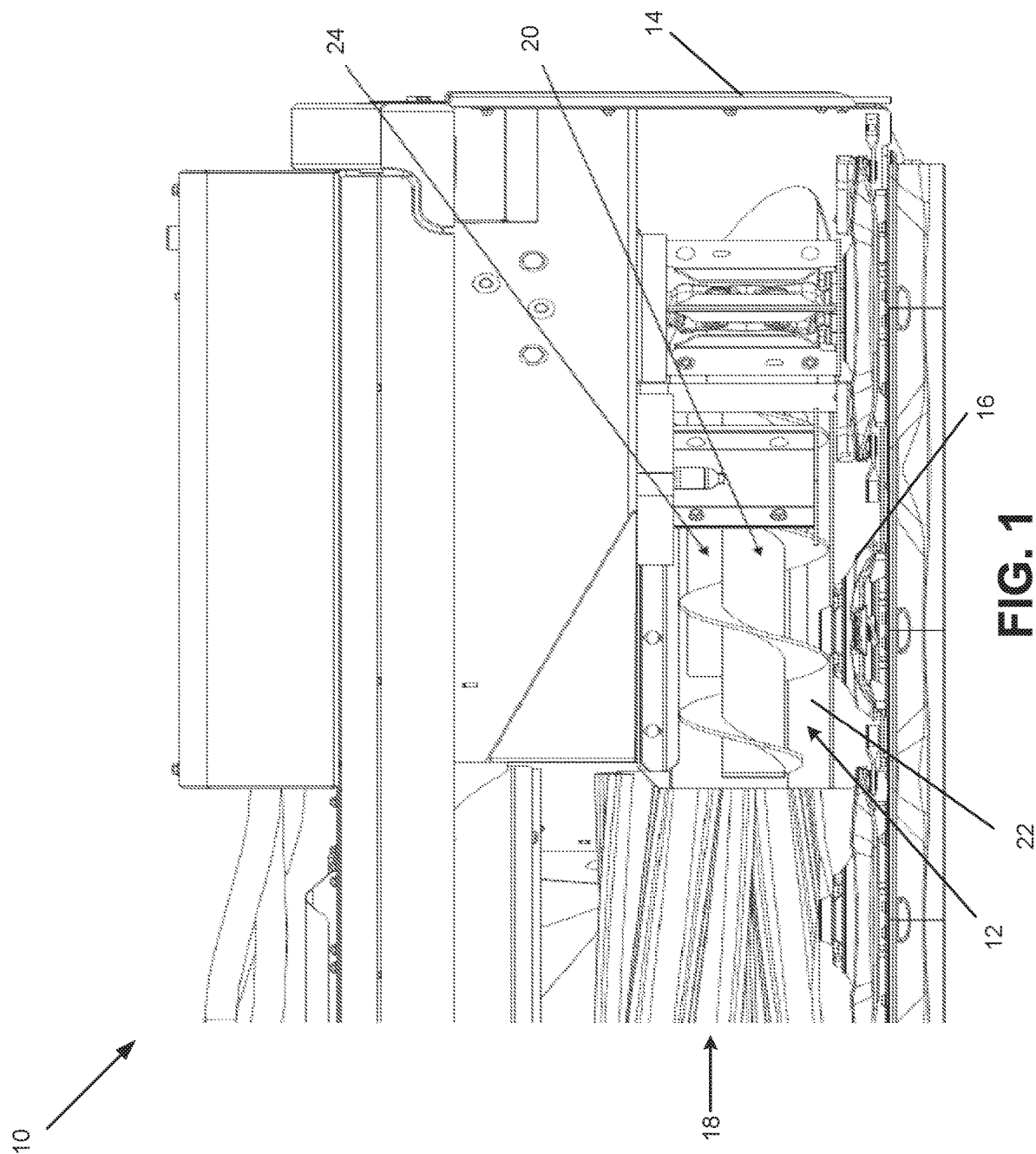
FIG. 1 is a schematic diagram that illustrates, in front cut-away elevation view, a portion a disc/rotary mower header in which an embodiment of an auger wrapper system is used.

Certain embodiments of an auger wrapper system are disclosed that reside in a disc/rotary mower header to facilitate removal of built-up crop material on one or more auger wrappers. In one embodiment, the auger wrapper system comprises one or more augers and one or more auger wrappers (or similarly, auger panels), each comprising a liner of either a metal or non-metal material attached thereto. The one or more augers are oriented horizontally and transversely to a forward/rearward direction of travel of a windrower (self-propelled or towed) to which the header is coupled. The one or more augers comprise flighting that, through rotation of the one or more augers (via one or more shafts coupled to the augers and powered by hydraulic motors), are used to influence severed/cut crop material from the rotary discs inward towards a center of the header for conditioning and eventual discharge to the ground as a swath or windrow. The auger wrapper associated with each auger has a curved shape (or a shape that approximates a curve in some embodiments) that, in one embodiment, is concentric to, and partially surrounds, the respective auger. Each auger wrapper comprises a liner attached thereto, the liner also having a curvature by virtue of the attachment to the curved-shape auger wrapper. In a natural or ordinary state, the liner is flat or substantially flat. In one embodiment, the liner is comprised of a metal material. In some embodiments, the liner has structural memory or elasticity to it, taking the form of the curved shape of the auger wrapper when attached thereto, but returning to a flat or substantially flat shape (natural or original shape) when partially or fully removed from the auger wrapper. In one embodiment, the liner is comprised of a non-metal material, including a polymer material. In some embodiments, the liner has structural resiliency or deformation elasticity to it, changing shape upon impact of a threshold blunt force, the change in shape somewhat like that observed for a drum head, yet immediately or shortly thereafter returning to its un-deformed shape when the impact force is removed.

Digressing briefly, and as noted in the background, current auger wrappers are exposed to cut (mowed) crop material as the augers operate in conjunction with the disc/rotary mowers, which includes a mix of dirt and vegetation. This mixture hardens on the rigid surface of the auger wrapper. Over time, the mowing/conditioning process results in a lamination of this built-up mixture on surfaces of the header, which can interfere with the flightings of the augers and other rotating elements of the header. Certain embodiments of an auger wrapper system make it easier to remove the mixture buildup while also making it harder for the mixture to adhere to the auger wrapper, and in particular, the liner and possibly areas of the auger wrapper adjacent the liner, reducing the need for significant cleaning operations and/or extending the service life of rotating elements of the header.

Having summarized certain features of an auger wrapper system of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on a disc/rotary mower header having truncated augers on opposing sides of the header, though it should be appreciated by one having ordinary skill in the art that other designs may benefit when auger wrappers are used, including designs with multiple pairs of augers, augers that run transversely across the center portion of the header, among other designs. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of a header and/or windrower looking forwardly.

FIG. 1 is a schematic diagram that illustrates, in front perspective view, a portion of a disc/rotary mower header 10 in which an embodiment of an auger wrapper system 12 is used, which comprises at least in part an auger-based system. It should be appreciated by one having ordinary skill in the art, in the context of the present disclosure, that the disc/rotary mower header 10 is illustrative of one type of disc/rotary mower header, and that in some embodiments, disc/rotary mower headers of different designs may be used and hence are contemplated to be within the scope of the disclosure. The disc/rotary mower header 10 (hereinafter, also referred to merely as header 10) shown in FIG. 1 is a left front (cut-away elevation) portion of the header 10 (with the description equally applying for other auger/auger wrapper combinations and hence omitted here for brevity), and comprises a frame 14 having front and rear portions, plural disc/rotary cutters 16 (also, simply referred to as discs), and rotating mower conditioner elements 18. The plural disc/rotary cutters 16 are located in the front and lower portion of the frame 14, spaced apart transversely along the width of the frame 14, and function to sever/cut the crop material based on the rotary motion of the discs 16. The rotating mower conditioner elements 18 process (e.g., condition) the cut crop material, effectively facilitating the drying of any discharged swath or windrow in the field. The plural disc/rotary cutters 16 and rotating mower conditioner elements 18 are conventional, having known functionality and hence further description of the same are omitted here for brevity.

The auger wrapper system 12 comprises an auger 20 that is located rearward and above the plural disc/rotary cutters 16 and extends transversely to the forward/rearward direction of travel of a machine to which the header 10 is attached (e.g., self-propelled windrower, towed behind a tractor, etc.). The auger 20 is shown in partial view (obscured in part by machine components), the auger 20 extending from a location proximal to a left-side of the end of the header 10 and inward proximal to a longitudinal centerline of the header 10. Though a single auger 20 is shown, in some embodiments, a pair of augers may be used. In some embodiments, one or more augers may extend transversely across the longitudinal centerline of the header 10. The auger 20 comprises flighting, as is known, to influence the movement of cut crop material from the disc/rotary cutters 16 inward toward the center (for processing by the mower conditioner elements 18 and eventual discharge as a swath or windrow). The auger wrapper system 12 further comprises an auger wrapper 22. In one embodiment, the auger wrapper 22 partially surrounds the auger 20 and is concentric to the auger 20. In other words, the auger wrapper 22 comprises a curved shape, with the auger 20 in front of the auger wrapper 22.

In some embodiments, the auger wrapper 22 comprises a shape that approximates a curve. For instance, the auger wrapper 22 may be structured with multiple straight line segments whose faces are tangent to a virtual inside diameter. That is, the auger wrapper 22 may be embodied as a series of piece-wise linear segments resulting in multiple edges that collectively form a shape that approximates a curve. If the angle at each segment transition (e.g., from one segment to the next) is small enough, the liner 24 may be attached in a manner that is sufficiently adjacent and conformal to the auger wrapper (e.g., the transitions do not cause a significant quantity and/or extent of gaps between the auger wrapper surface and the liner 24) to be effective in shedding crop material from the liner 24 upon a shape change of the liner 24 (e.g., imposed by blunt force or upon full or partial removal from the auger wrapper 22 to enable a return to its original or natural state). Too large an angle between segments may necessitate that the liner 24 be pre-formed on respective straight-line segments, which may be less effective given the higher local stiffness on pre-formed areas.

Continuing with the curved auger wrapper embodiment description with similar applicability to approximated curved embodiments (e.g., piece-wise linear) embodiments, the proximity of the auger wrapper 22 to the auger 20, in combination with the rotation of the auger 20 relative to the fixed auger wrapper 22, prevents crop material from becoming entangled around the auger 22 as the auger rotates and receives crop material from the disc/rotary cutters 16. The auger wrapper 22 extends transversely along a portion of the header 10, in one embodiment spanning approximately the same width as the auger 20, though in some embodiments, the auger wrapper 22 may extend further or less than the width of the auger 20.

Attached to the auger wrapper 22 is a liner 24. The liner 24 may be positioned strategically on the auger wrapper 22, such as in locations more prone to material build-up, including areas where there is less interaction of the auger 20 with the crop material. In some embodiments, the liner 24 may have an extended length to cover more of the auger wrapper 22 than embodiments where the liner 24 is more strategically placed. The auger wrapper 22 comprises an opening (e.g., a square or rectangular opening, best shown in FIG. 4B, though not limited to these geometrical shapes), wherein the liner 24 is centered over, and covers, the opening. The liner 24 may be comprised of a metal material or a non-metal material. The liner 24 comprises a rigidity that is less than the rigidity of the material of the auger wrapper 22. For instance, in embodiments where the liner 24 is comprised of a non-metal material (e.g., a polymer material, including polyethylene such as ultra-high-molecular weight polyethylene (UHMW), polytetrafluoroethylene (PTFE), acrylonitrile butadiene styrene (ABS), polyoxymethylene (POM), high density polyethylene (HDPE), etc., or other material including reinforced rubber, canvas/tarp material, vinyl, polyester, etc.), the liner 24 comprises resiliency or a deformation elasticity, wherein impact forces (e.g., via an operator striking the liner 24 using a hammer, foot, etc.) rendered upon the liner 24 comprises enough force to temporarily deform the liner 24. This deformation causes the bonds enabling adherence of the crop material to the liner 24 to break or weaken, resulting in the adhered crop material to be shed from (broken off) the liner 24. The structure of the liner 24 returns to its normal or natural state immediately or shortly after the impact force, with this cycle of normal structural state, to deformation or change in shape, back to normal or natural state, enabling ease of removal of the buildup of crop material on the liner 24. Such features of a non-metal liner 24 lend themselves to installing the liner 24 in a more permanent manner to the auger wrapper 22 (e.g., using fixed securement mechanisms versus detachable mechanisms), though in some embodiments, the non-metal liner 24 may be secured using detachable securement mechanisms. Notably, the mitigation of crop material build-up prevents interference with the auger 20 or other rotating elements proximal thereto, possibly leading to extended service life.

In some embodiments, the liner 24 is comprised of a metal material that is flexible (again, less rigid than the auger wrapper 22), and which has elasticity/structural memory in a sense that, if removed fully or at least in part (e.g., from the top/upper portion of where the liner 24 is attached to the auger wrapper 22, or from the bottom/lower portion of where the liner 24 is attached to the auger wrapper 22) from the auger wrapper 22, returns to its natural (e.g., flat) state. In other words, the liner 24 may naturally comprise a flat or substantially flat panel (e.g., rectangular, though other geometrical shapes may be used in some embodiments) of metal material. When attached to the auger wrapper 22, which as explained above in some embodiments has a curvature to it, the liner 24 is flexible enough to have a shape change that conforms to the curvature of the auger wrapper 22. As crop material builds up over time and over repeated operations, an operator may remove all or a portion (e.g., the top portion) of the liner 24, which causes the liner 24 to change shape (e.g., become flatter), which breaks or weakens the bonds of crop material adhering to the liner 24. Accordingly, the crop material breaks off of the liner 24. Such features of a metal liner 24 lend themselves to using removable (detachable) securement mechanisms, at least in part, when attaching to the auger wrapper 22. For instance, in some embodiments, the liner 24, when comprised of a metal material, does not have the same deformation elasticity as a non-metal material, and at least for some metals, impact forces may permanently deform the liner 24. In some embodiments, the metal liner 24 may have sufficient deformation elasticity to withstand impact forces without permanently deforming. In some embodiments, the liner 24 may be entirely removed (e.g., when entirely secured to the auger wrapper 22 with removable attachment hardware, including latches, clamps, etc.), enabling more extensive cleaning (e.g., pressure washing) of the auger wrapper 22.

Figures 2A, 2B:
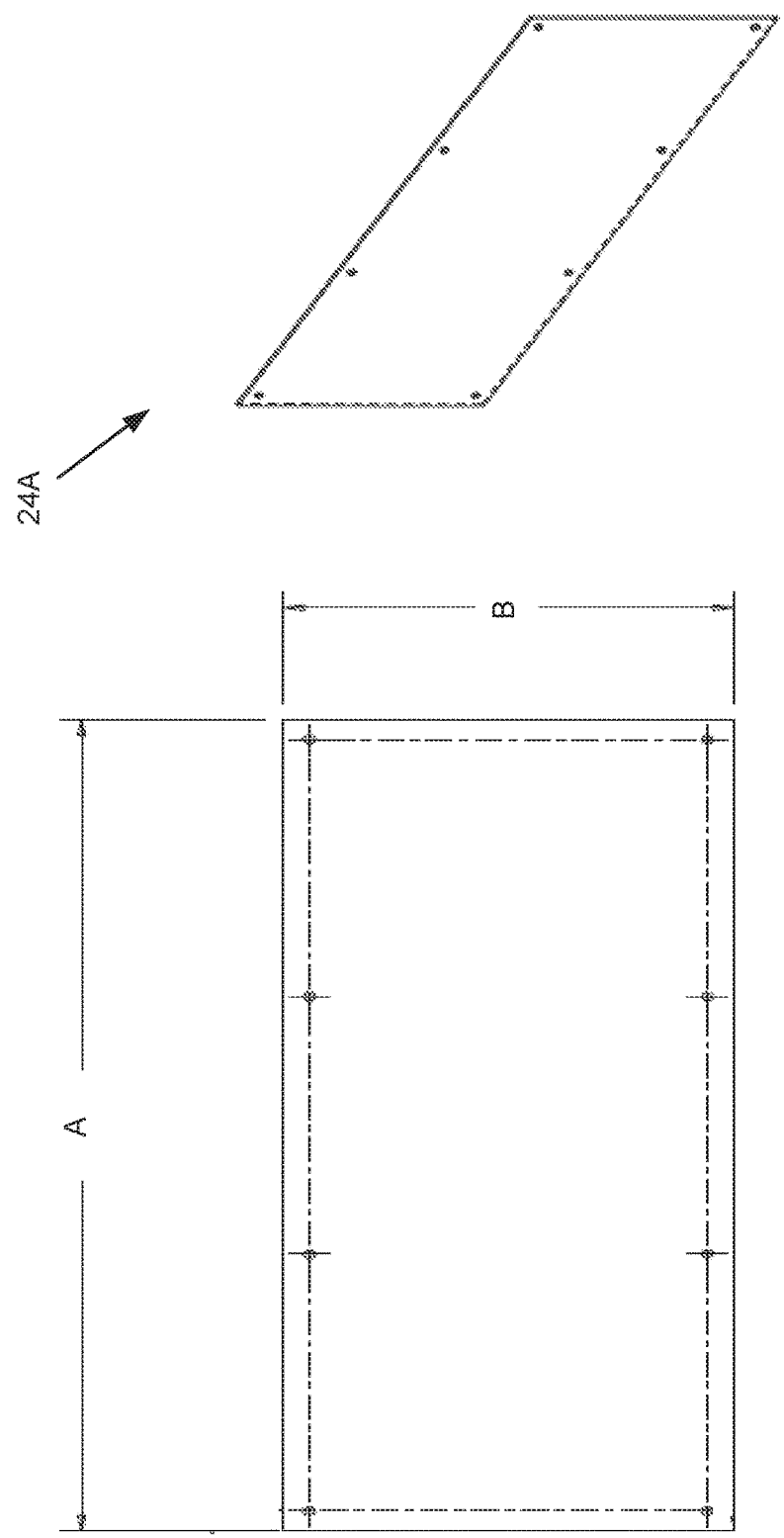
FIGS. 2A-2B are schematic diagrams that illustrate in front elevation and perspective views, respectively, an embodiment of a non-metal liner used in an auger wrapper system.

Having described an embodiment of an example auger wrapper system 12, attention is directed to FIGS. 2A-2B, which illustrate in front elevation and perspective views, respectively, an embodiment of an example non-metal liner 24A used in the auger wrapper system 12. Though shown rectangular in geometry, it should be appreciated by one having ordinary skill in the art, in the context of the present disclosure, that some embodiments of a liner 24A may comprise other geometries/shapes. In the depicted embodiment, the liner 24A is depicted with various example dimensions, including a length of A millimeters (mm) and a height of B mm, where A is approximately 600 mm and B is approximately 250 mm. The thickness of the liner 24A depends on the material used for the liner 24. In some embodiments, the thickness of the liner 24A may be in the range of 10-20 mils. In some embodiments, the thickness of the liner 24A may be in the range of 6-7 millimeters. Other ranges may be used depending on the material used. Note that in some embodiments, a metal liner 24 may have similar dimensions. Further, other dimensions may be used depending on the desired area of coverage and/or other conditions or design considerations. The liner 24A is shown in its original or natural state, and has the flexibility or elasticity to take on a curved shape (or approximately curved shape) when attached to the auger wrapper 22. In some embodiments, the liner 24A comprises a deformation elasticity or resiliency that prevents permanent deformation when subject to a momentary blunt force or short, repeated impact forces, to remove build-up of crop material. For instance, the liner 24A may be comprised, all or in substantial part, of a polymer material, among other non-metal materials including reinforced rubber, canvas/tarp material, vinyl, polyester, etc.

Figure 3A:
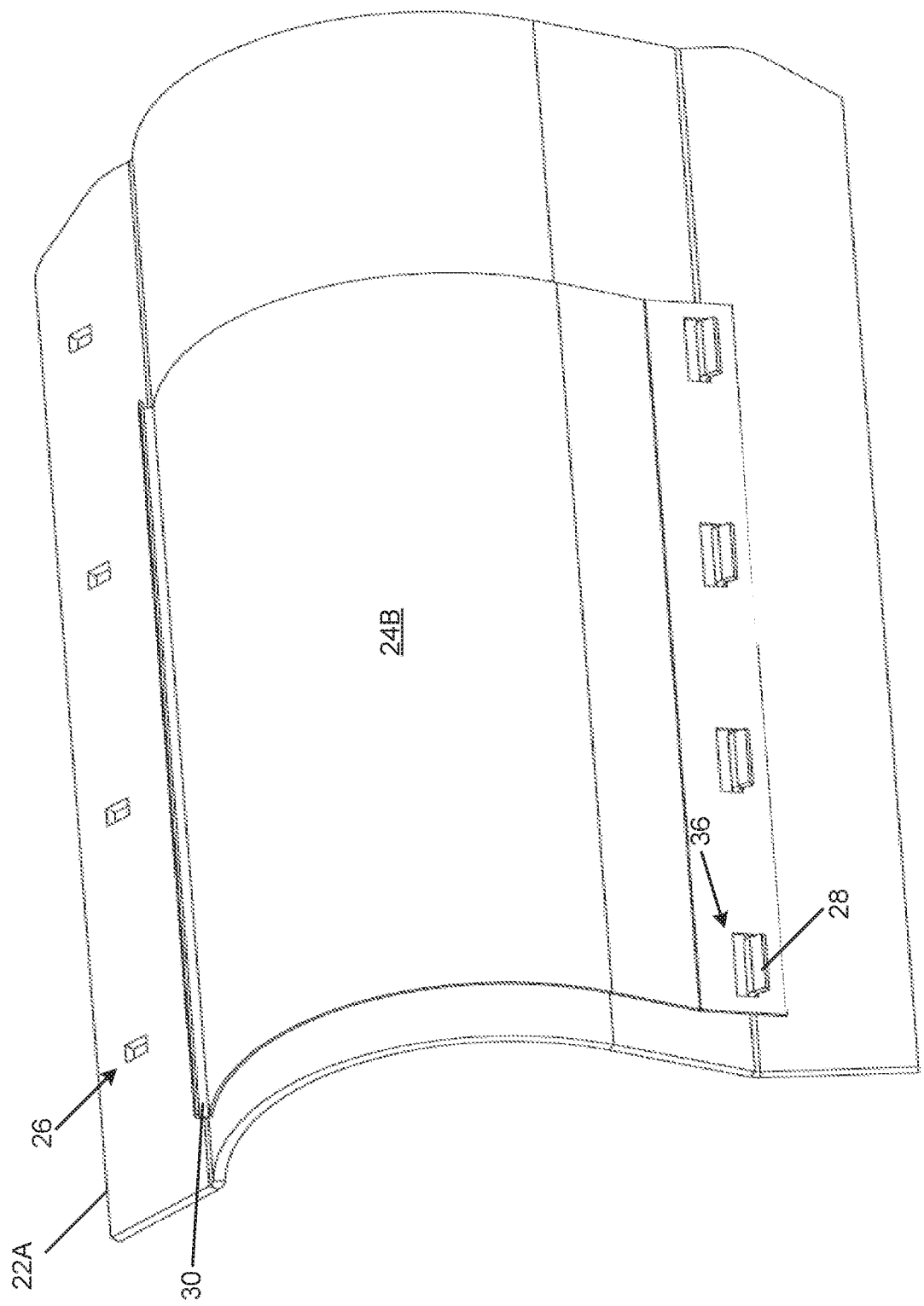

FIGS. 3A-3F show an embodiment of a metal liner 24B. Referring to FIG. 3A, the liner 24B is depicted as attached to an embodiment of an auger wrapper 22A (where the manner of attachment between the upper surface of the liner 24B with the auger wrapper 22A is omitted in FIG. 3A). In one embodiment, the metal liner 24B has similar dimensions to that described in association with the non-metal liner of FIGS. 2A-2B. The liner 24B is centered over an opening (best shown in FIG. 4B) in the auger wrapper 22A. The auger wrapper 22A comprises a curved shape, wherein surfaces within the concave portion of the auger wrapper 22A is adjacent to, and partially surrounds the auger 20 (FIG. 1). The liner 24B is attached to at least a portion of the rear, convex portion of the auger wrapper 22A. In one embodiment, the auger wrapper 22A comprises plural slots 26 spaced apart transversely along an upper surface of the auger wrapper 22A. As explained further below, components used to removably or detachably couple the liner 24B to the auger wrapper 22A are installed at each of these slots 26. The auger wrapper 22A further comprises plural tabs 28 (e.g., sheet metal tabs or protrusions) spaced apart transversely along a lower surface of the auger wrapper 22A. As explained below, the tabs 28 are used in some embodiments to enable attachment to a lower surface of the liner 24B. The liner 24B comprises a lip 30 running transversely along a top end of the liner 24B. The lip 30 comprises a hook or "J" shape that hooks in a direction away from the auger wrapper 22A.

FIG. 3B shows an example removable attachment component in the form of a latch 32 that enables removable or detachable connection between an upper end of the liner 24B and the auger wrapper 22A. As shown in FIG. 3B, and referring also to FIG. 3A, a base of the latch 32 is secured to one of the slots 26 of the upper surface of the auger wrapper 22A, with a connecting member 34 of the latch 32 coupling the base (and hence the upper surface of the auger wrapper 22A) with the lip 30 of the liner 24B. In other words, the connecting member 34 comprises a hooked end that hooks to the lip 30 in detachable fashion, enabling the upper end of the liner 24 to be removable from along the top surface of the auger wrapper 22A. It is noted that there are plural latches 32 inserted among the plural slots 26 of the upper surface of the auger wrapper 22A, though only one is shown for ease of illustration and explanation. Note that the mechanism for removable attachment of the liner 24B to the auger wrapper 22A is illustrative of one example, and that in some embodiments, other mechanisms for removable attachment may be used including the use of other types of removable attachment components.

Figures 3C, 3D:
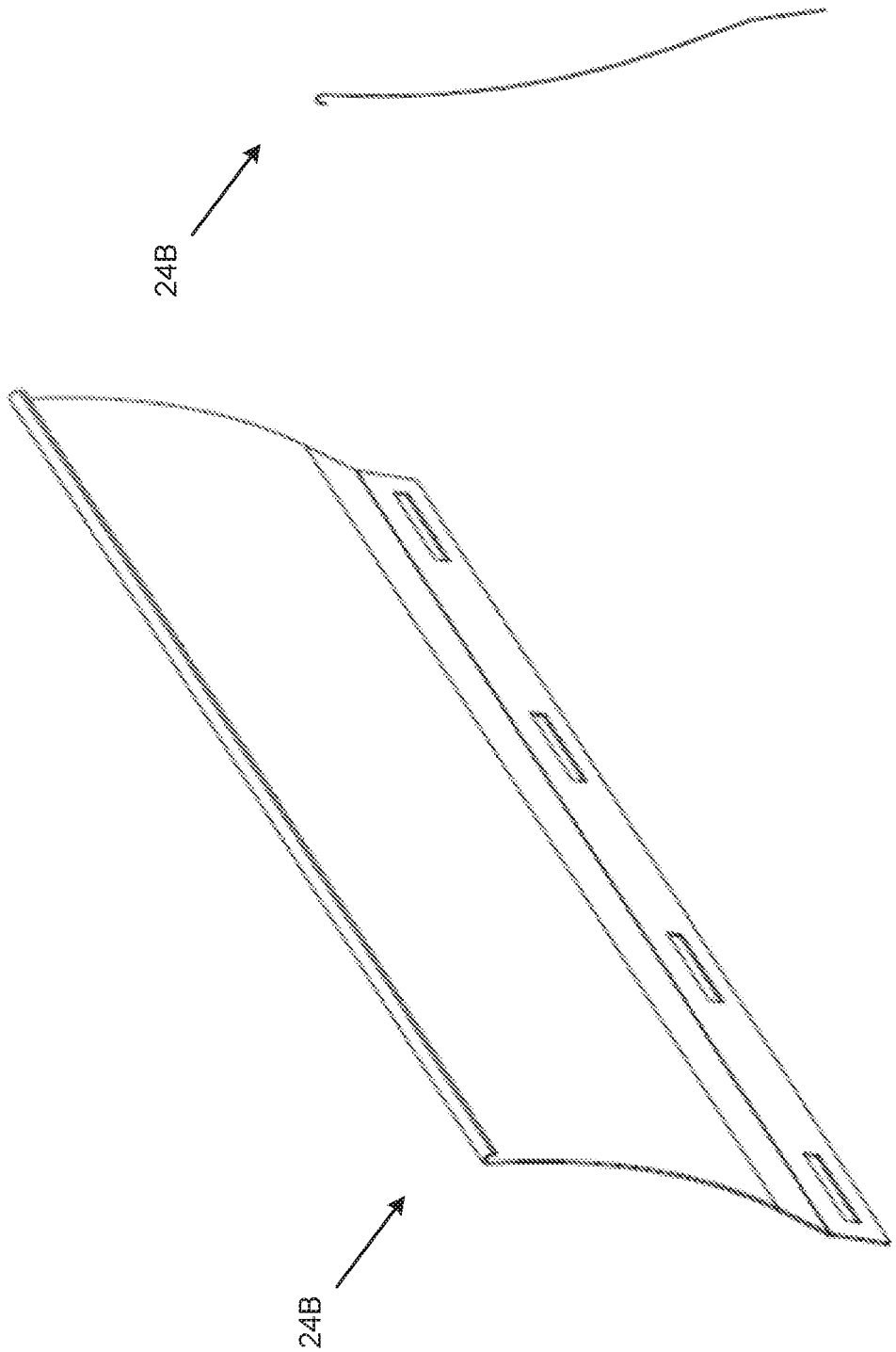

Referring again to FIG. 3A, the liner 24B comprises plural slots 36 spaced apart transversely along a lower surface of the liner 24B. The plural slots 36 receive the plural tabs 28 of the auger wrapper 22A, enabling a detachable or removable connection or between the lower end of the liner 24 and the auger wrapper 22A. It is noted that the liner 24B has taken on the curved shape of the auger wrapper 22A based on the attachment (though not explicitly shown in FIG. 3A, assumed along the top of the liner 24B) of the liner 24B to the auger wrapper 22A. Ordinarily, the liner 24B comprises a flat or substantially flat shape when unattached (at least partially) from the auger wrapper 22A, the change in shape between the unattached state and the attached shape enabling built-up material to lose its bond with the liner 24B and break off from the liner 24B. For instance, and referring to FIGS. 3C-3D, shown is the metal liner 24B without depicting the auger wrapper 22A. The metal liner 24B is shown in perspective in FIG. 3C with a slightly bowed shape as its unattached (or partially unattached) shape, as further detailed in an end elevation view in FIG. 3D. In other words, the original or natural structural state of the metal liner 24B has a slight curvature to it. In some embodiments, the metal liner 24B may be completely flat.

Figure 3F:
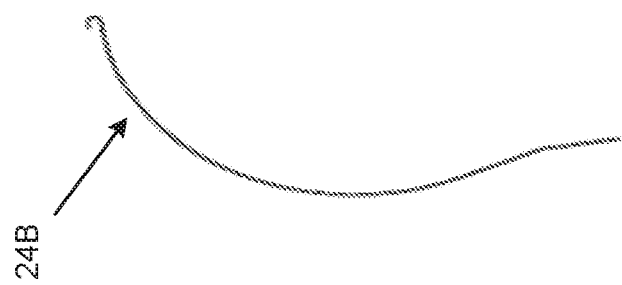
Figure 3E:
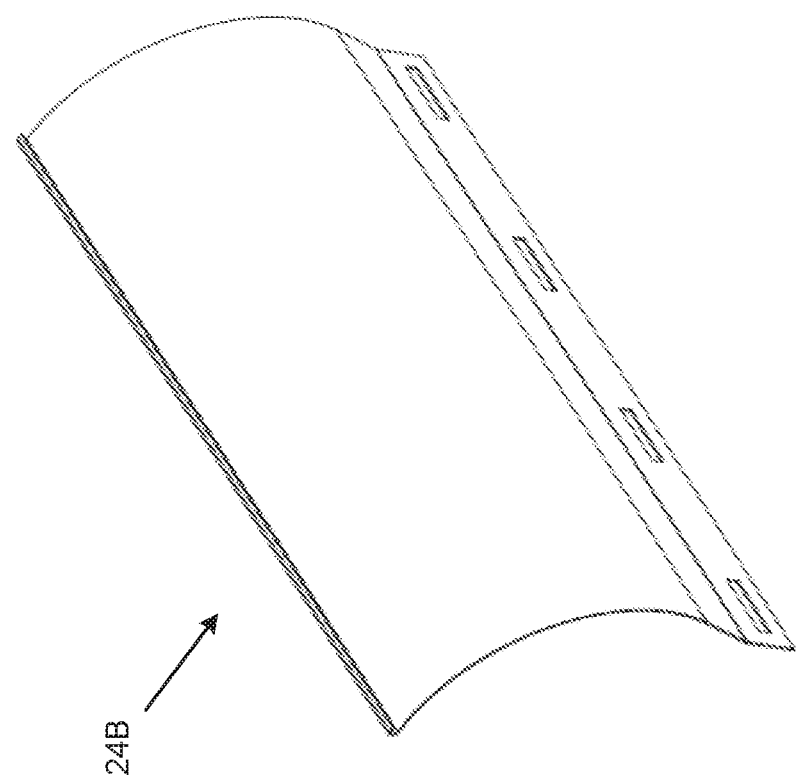

Referring to FIGS. 3E-3F, the liner 24B is shown having a curved shape comparable to the shape of the auger wrapper 22A shown in FIG. 3A. In other words, in the example depicted in FIGS. 3E-3F, the shape of the liner 24B is due to the complete attachment of the liner 24B to the auger wrapper 22A, which reveals the elasticity of the metal liner 24B. Note that in one embodiment, the liner 24 (e.g., liner 24B) is comprised of carbon steel, though other types of metals may be used in some embodiments.

Figure 4B:
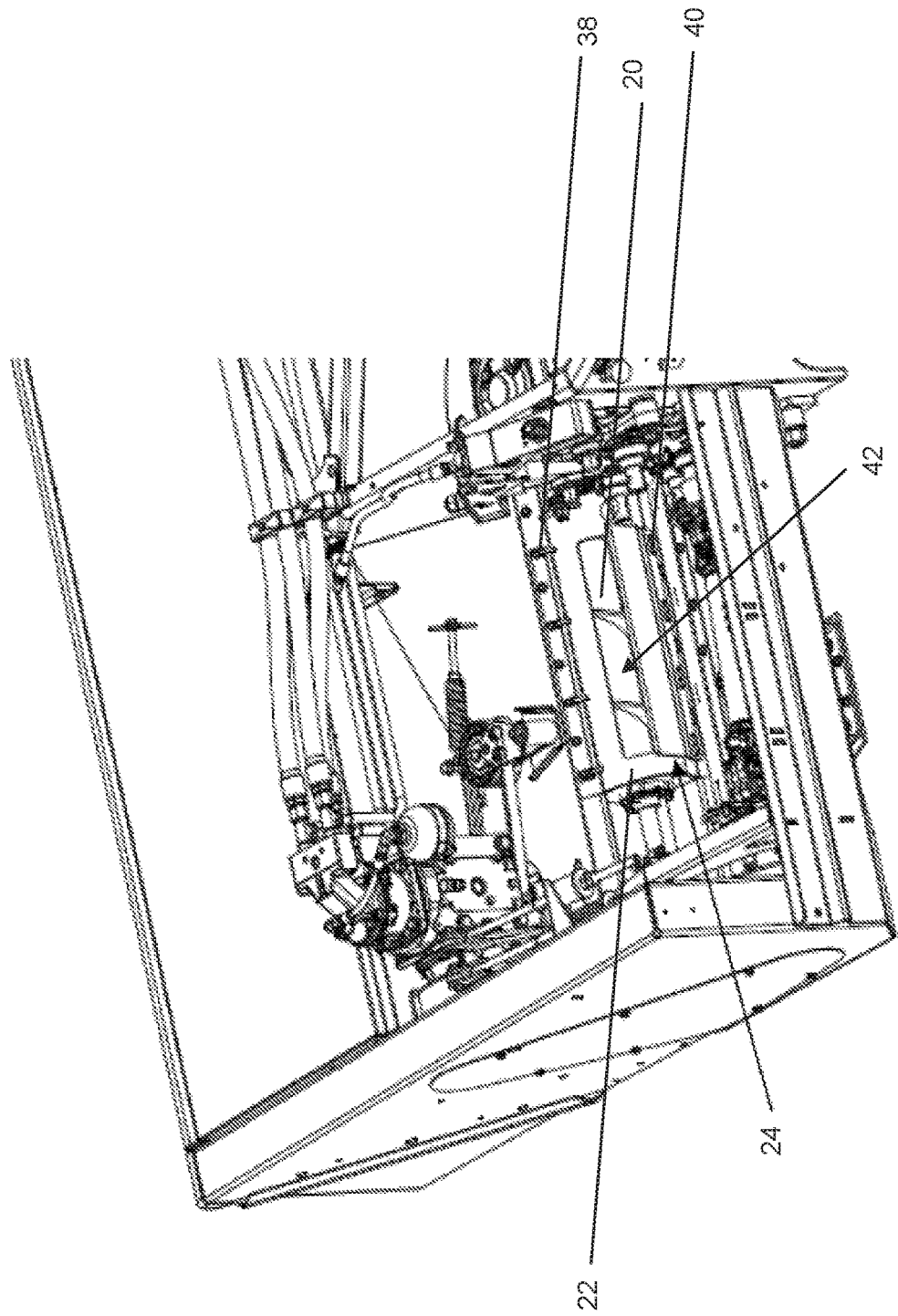

Having described an embodiment of an auger wrapper 22A and liner 24B attached to the auger wrapper 22A, attention is directed to FIGS. 4A-4B, which illustrate, in rear perspective view, an example auger wrapper 22 of the auger wrapper system 12 with different stages of securement, using a combination of removable/detachable and fixed securing mechanisms, of an embodiment of a liner 24 to the rear surface of the auger wrapper 22. The methods of securement depicted in FIGS. 4A-4B are illustrative of one example that uses a combination of removable attachment (detachable) securing mechanisms on the top/upper side of the liner 24 and fixed (e.g., more permanent or more difficult and/or time consuming to detach than the detachable securement mechanisms) securement mechanisms on the bottom/lower side of the liner 24, though it should be appreciated by one having ordinary skill in the art, in the context of the present disclosure, that a variety of securement methods may be used, including using all fixed, all removable, or a combination of fixed and removable at various (even different) locations relative to the liner 24 and auger wrapper surface, including according to those methods disclosed in FIGS. 3A-3B. As shown in FIG. 4A, the liner 24 is attached to the rear surface of the auger wrapper 22, including the use of removable attachments 38 in spaced apart positions transversely along upper surfaces of the liner 24 and the auger wrapper 22, and fixed attachments 40 spaced apart transversely along lower surfaces of the liner 24 and the auger wrapper 22. In one embodiment, the fixed attachments 40 may be pivots (e.g., hinge hardware) that, when the upper surface of the liner 24 is released, the pivots enable a pivoting motion of the lower portion of the liner 24 while remaining attached to the auger wrapper 22. In some embodiments, the fixed attachments 40 may be embodied as rivets, screws, bolts, pins, welds, among other types of more permanent securing mechanisms. In one embodiment, the removable attachments 38 are configured as latches, such as the latch 32 of FIG. 3B. Though depicted as a latch 32 for illustration, in some embodiments, the removable attachment 38 may be embodied in other readily-releasable types of securement mechanisms, including clamps, a rubber loop and catch, tab and slot mechanisms as illustrated in FIG. 3A, among other known releasable securing mechanisms.

Referring to FIG. 4B, shown is the liner 24 detached at the top/upper surface from the auger wrapper 22, revealing an opening 42 in the auger wrapper 22 that exposes (from the back side of the auger wrapper 22) the auger 20. Though the opening 42 is depicted as rectangular in geometry, in some embodiments, other geometries of a similar or smaller dimension may be used for the opening. Further, in some embodiments, there may be more than a single opening 42, covered by one or more liners 24, for a given auger wrapper 22. The opening 42 also reveals from FIG. 4B that the liner 24 is centered over the opening 42 when attached. In this example illustration, the removable attachments 38 are manipulated by an operator to release the attachment between the top (rear) surface of the liner 24 and the auger wrapper 22, and the liner 24 remains fixably attached along the lower (rear) surface of the liner 24 and auger wrapper 22 via the fixed attachments 40. Note that attachments to the surfaces of the auger wrapper 22 contemplate intermediate structures that are attached between the liner 24 and the auger wrapper 22 (and connected together), such as a bracket or other structure. As shown, the liner 24 changes shape when at partly released (at the top side/surface), returning (substantially) to its original or natural structural state as a flat or substantially flat panel. In doing so, bonds created between a (front) surface of the liner 24 and the crop material are weakened/broken, whereby the crop material falls off the liner 24. In some cases, surfaces of the auger wrapper 22 that the crop material overlaps with the liner 24 (adjacent the liner 24) are also shed of the crop material based on the change in shape of the liner 24.

Though depicted as temporarily removing the top side/surface of the liner 24 from the auger wrapper 22, in some embodiments, removable attachments 38 may be positioned on the lower side/surface of the liner 24 (e.g., as shown in FIG. 3A), or in some embodiments as described in FIGS. 3A-3B, entirely around the periphery of the liner 24 (e.g., in lieu of any fixed attachments, such as to entirely remove the liner 24). In some embodiments, all securement mechanisms used to secure the liner 24 to the auger wrapper 22 may be comprised of the fixed attachments 38 (e.g., not necessarily of a pivot variety), wherein the liner 24 is designed to remain (more permanently, or with removal made more difficult or time-consuming than if detachable) in the position centered over the opening 30. In this latter embodiment, the liner 24 may be comprised of a non-metal material (e.g., polymer) that has deformation elasticity/resiliency, such that a temporary blunt force rendered on the back (or front) surface of the liner 24 weakens or breaks the bond of crop material adhering to the liner 24, resulting in the crop material being shed from the liner 24 (and even adjacent surfaces where there is overlap of material on the liner 24 and auger wrapper 22).

Note that the liner 24 has been illustrated in FIGS. 4A and 4B as attached to the rear side of the auger wrapper 22 (e.g., the auger wrapper 22 is disposed between the auger 20 and the liner 24), though some embodiments may attach the liner 24 to a front side of the auger wrapper 22 (e.g., the liner 24 is disposed between the auger 20 and the auger wrapper 22). In some embodiments, the liner 24 may comprise one or more uncovered openings. For instance, and referring to FIG. 4A, plural (e.g., three (3)) uncovered openings 44 are disposed in the liner 24, enabling an operator to position a tool (e.g., crowbar) in the opening 44 to disturb (e.g., shake, pull, push) the liner 24, forcing the liner 24 to change shape and, through the shape change, cause the crop material adhering to the liner 24 to fall/shed off. Though depicted using three openings 44, it should be appreciated that other quantities in the same elevation (or at a different elevation) along the liner 24 may be used in some embodiments, or none at all in some embodiments, and hence are contemplated to be within the scope of the disclosure.

It should be emphasized that the above-described embodiments of the present disclosure, particularly, any "preferred" embodiments, are merely possible examples of implementations, merely set forth for a clear understanding of the principles of the disclosed embodiments. Many variations and modifications may be made to the above-described embodiment(s) of the disclosure without departing substantially from the scope of the disclosure. For instance, though shown with a single liner 24 along an auger wrapper 22 (e.g., FIG. 3A), in some embodiments, plural liners 24 may be used along an auger wrapper 24. Two or more of the embodiments disclosed herein may be combined in any combination. All such modifications and variations are intended to be included herein within the scope of this disclosure and protected by the following claims. Any reference signs in the claims should be not construed as limiting the scope.

The invention claimed is:

1. An auger-based system used in processing of crop material, comprising:
   a frame;
   an auger operably coupled to the frame;
   an auger wrapper fixed to the frame and proximal to the auger, the auger wrapper comprising a curved surface with a first rigidity; and
   a liner having a front surface and a rear surface, the liner attached to the auger wrapper with the front surface facing the auger and the rear surface contacting the auger wrapper, the liner comprising a second rigidity that is less rigid than the first rigidity such that the liner conforms to the curved surface of the auger wrapper.

2. The system of claim 1, wherein the auger wrapper is comprised of metal.

3. The system of claim 2, wherein the auger wrapper comprises an opening and the liner is centered about the opening such that the rear surface of the liner is accessible through the opening.

4. The system of claim 3, wherein the liner is either:
fixably attached to the auger wrapper along, and adjacent to, a bottom of the opening and removably attached to the auger wrapper along, and adjacent to, a top of the opening; or
fixably attached to the auger wrapper along, and adjacent to, the top of the opening and removably attached to the auger wrapper along, and adjacent to, the bottom of the opening.

5. The system of claim 3, wherein the liner is removably attached to the auger wrapper along, and adjacent to, a top and bottom of the opening.

6. The system of claim 3, wherein the liner is fixably attached to the auger wrapper along, and adjacent to, a top and bottom of the opening.

7. The system of claim 3, wherein the liner is disposed between the auger and the opening.

8. The system of claim 3, wherein the auger wrapper comprises plural tabs adjacent to a lower surface of the auger wrapper and the liner comprises a lip running along an upper end of the liner and plural slots adjacent to and running along a lower surface of the liner, each of the plural tabs inserted through the respective plural slots to form lower end removable attachments between the auger wrapper and the liner, wherein plural latches are coupled between the lip and an upper surface of the auger wrapper to form upper end removable attachments between the auger wrapper and the liner.

9. The system of claim 1, wherein the liner is comprised of a metal material or a non-metal material.

10. The system of claim 1, wherein the liner, when at least partially detached from the auger wrapper, loses a curvature formed from the conformation of the liner to the curved surface of the auger wrapper.

11. The system of claim 1, wherein the liner has more elasticity than the auger wrapper.

12. The system of claim 1, wherein the liner comprises one or more uncovered openings.

13. A disc/rotary mower header, comprising:
a frame comprising a front portion and a rear portion;
plural rotary discs coupled laterally along the frame and proximal to the front portion;
one or more augers operably coupled to the frame and disposed laterally and adjacent the plural rotary discs;
one or more auger wrappers coupled to the frame and disposed rearward from, and adjacent to, the respective one or more augers, each of the one or more auger wrappers comprising a curved surface; and
for at least one of the auger wrappers, one or more liners having a front surface and a rear surface, the one or more liner attached to the at least one of the auger wrappers with the front surface facing the respective one or more augers and the rear surface contacting the respective one or more auger wrappers, the at least one of the auger wrappers less flexible than each of the one or more liners such that one or more liners conform to the curved surface of the auger wrapper.

14. The disc/rotary mower header of claim 13, wherein for at least one of the one or more liners, the at least one of the auger wrappers comprises an opening and the at least one of the one or more liners is centered about the opening.

15. The disc/rotary mower header of claim 14, wherein the at least one of the one or more liners is fixably attached to the at least one of the auger wrappers along auger wrapper surfaces surrounding the opening.

16. The disc/rotary mower header of claim 14, wherein the at least one of the one or more liners is at least partly removably attached to the at least one of the auger wrappers along auger wrapper surfaces adjacent the opening.

17. The disc/rotary mower header of claim 13, wherein the at least one of the one or more liners is comprised of metal having elasticity.

18. The disc/rotary mower header of claim 13, wherein the at least one of the one or more liners is comprised of a non-metal material.

19. An auger-based system used in processing of crop material, comprising:
a frame;
an auger operably coupled to the frame;
an auger wrapper fixed to the frame and proximal to the auger, the auger wrapper comprising a first rigidity; and
a liner having a front surface and a rear surface, the liner attached to the auger wrapper with the front surface facing the auger and the rear surface contacting the auger wrapper, the liner comprising a second rigidity that is less rigid than the first rigidity such that the liner conforms to the curved surface of the auger wrapper.

* * * * *